(12) United States Patent
Okawa et al.

(10) Patent No.: US 8,006,139 B2
(45) Date of Patent: Aug. 23, 2011

(54) DEGENERATION CONTROL DEVICE AND DEGENERATION CONTROL PROGRAM

(75) Inventors: Tomoyuki Okawa, Kawasaki (JP); Kuniki Morita, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 266 days.

(21) Appl. No.: 12/230,242

(22) Filed: Aug. 26, 2008

(65) Prior Publication Data
US 2008/0320327 A1  Dec. 25, 2008

Related U.S. Application Data

(63) Continuation of application No. PCT/JP2006/303619, filed on Feb. 27, 2006.

(51) Int. Cl.
*G06F 11/00* (2006.01)
(52) U.S. Cl. ........................ 714/42
(58) Field of Classification Search .................. 714/42
See application file for complete search history.

(56) References Cited

U.S. PATENT DOCUMENTS

| | | | |
|---|---|---|---|
| 4,760,546 A | 7/1988 | Ishida et al. | |
| 5,537,621 A | 7/1996 | Charlot et al. | |
| 2003/0088811 A1* | 5/2003 | Cherabuddi et al. | 714/42 |
| 2004/0088603 A1* | 5/2004 | Asher et al. | 714/42 |
| 2005/0044325 A1* | 2/2005 | Rowlands et al. | 711/139 |
| 2005/0160326 A1* | 7/2005 | Boatright et al. | 714/47 |
| 2006/0179230 A1* | 8/2006 | Fields et al. | 711/129 |
| 2008/0010566 A1* | 1/2008 | Chang et al. | 714/718 |
| 2008/0294847 A1* | 11/2008 | Maruyama et al. | 711/133 |
| 2009/0164727 A1* | 6/2009 | Penton et al. | 711/118 |
| 2009/0300413 A1* | 12/2009 | Chang et al. | 714/8 |
| 2010/0058109 A1* | 3/2010 | Chang et al. | 714/8 |

FOREIGN PATENT DOCUMENTS

| | | |
|---|---|---|
| JP | 54-096331 | 7/1979 |
| JP | 54-96331 | 7/1979 |
| JP | 54-106133 | 8/1979 |
| JP | 56-176729 | 12/1981 |
| JP | 58-81800 | 6/1983 |
| JP | 59-207098 | 11/1984 |
| JP | 61-7959 | 1/1986 |
| JP | 61-007959 | 1/1986 |

(Continued)

OTHER PUBLICATIONS

Japanese Notice of Rejection for corresponding Japanese Application 2008-501577; mailed Apr. 7, 2009.
European Office Action for corresponding European Application 06714756.1; mailed Jul. 2, 2009.
International Search Repot for PCT/JP2006/303619, mailed Jun. 27, 2006.

*Primary Examiner* — Bryce Bonzo
(74) *Attorney, Agent, or Firm* — Fujitsu Patent Center

(57) ABSTRACT

A degeneration control device that controls degeneration of a cache having a plurality of ways based on an error that occurs in response to an access request, includes a cache line degeneration information memory unit, which stores cache line degeneration information that indicates whether a cache line constituting each of the plurality of ways is degenerated, and a degeneration control unit, which writes, when an error that occurs in response to the access request causes a predetermined condition to be met, cache line degeneration information that indicates a predetermined cache line where the error occurs is degenerated in the cache line degeneration information memory unit.

4 Claims, 10 Drawing Sheets

FOREIGN PATENT DOCUMENTS

| | | |
|---|---|---|
| JP | 61-226851 | 10/1986 |
| JP | 63-200250 | 8/1988 |
| JP | 2-302856 | 12/1990 |
| JP | 06-004336 | 1/1994 |
| JP | 06-067980 | 3/1994 |
| JP | 6-504865 | 6/1994 |
| JP | 06-259324 | 9/1994 |
| WO | 2005/066782 | 7/2005 |

* cited by examiner

FIG.3

| CACHE TAG | | | | | | |
|---|---|---|---|---|---|---|
| INDEX | ... | WAY n | | | | ... |
| ⋮ | ⋮ | ⋮ | | | | ⋮ |
| m | ... | DEGENERATION FLAG (CACHE LINE / WAY) | REGISTRATION ADDRESS | STATUS | ECC | ... |
| ⋮ | ⋮ | ⋮ | | | | ⋮ |

FIG.4

| ERROR COUNTER | | | | | | |
|---|---|---|---|---|---|---|
| WAY | | | | | | |
| ... | n | | | | | ... |
| ... | ... | BIT i | ... | BIT j | ... | ... |

DEGENERATION CONTROL DEVICE AND DEGENERATION CONTROL PROGRAM

CROSS REFERENCE TO RELATED APPLICATIONS

This is a continuing application, filed under 35 U.S.C. §111(a), of International Application PCT/JP2006/303619, filed Feb. 27, 2006, the contents of which are incorporated herein by reference.

BACKGROUND OF THE INVENTION

1. Field of the Invention

The present invention relates to a degeneration control device and a degeneration control program which control degeneration of a cache having a plurality of ways based on an error that occurs in response to an access request.

2. Description of the Related Art

Conventionally, there has been known a technology to perform a degeneration control (a control to put all or some part of data storage area into an unusable state) on a cache memory that adopts a set associative scheme. Specifically, a number of correctable errors that occur inside a cache memory is counted in each way that indicates a column position inside the cache memory, and the degeneration control is performed on a way where the number of errors exceeds a predetermined threshold value (see Japanese Patent Application Laid-Open No. H2-302856, for example). Thus, with the conventional technology, the degeneration control is performed before the correctable errors that occur inside the cache memory cause a serious failure (e.g., an uncorrectable error), whereby reliability of the inside of the computer system is enhanced.

DISCLOSURE OF INVENTION

Problem to be Solved by the Invention

The conventional technology above, however, has a problem of sacrificing operational performance of a cache memory. Specifically, with the conventional technology, for example, when an error (e.g., an error of stored data) occurs in a cache line (i.e., a minimum unit of a data storage area) inside a cache memory as illustrated in FIG. 11, a degeneration control is performed on an entire way that includes the cache line. Thus, capacity of the cache memory is wastefully degraded by capacity of normal cache lines included in the way on which the degeneration control is performed, and as a result, operational performance of the cache memory is degraded.

SUMMARY

It is an object of the present invention to at least partially solve the problems in the conventional technology.

A degeneration control device according to one aspect of the present invention controls degeneration of a cache having a plurality of ways based on an error that occurs in response to an access request, and includes a cache line degeneration information memory unit, which stores cache line degeneration information that indicates whether a cache line constituting each of the plurality of ways is degenerated, and a degeneration control unit, which writes, when an error that occurs in response to the access request causes a predetermined condition to be met, cache line degeneration information that indicates a predetermined cache line where the error occurs is degenerated in the cache line degeneration information memory unit.

A computer-readable recording medium according to another aspect of the present invention stores therein a computer program for controlling degeneration of a cache having a plurality of ways based on an error that occurs in response to an access request, and the computer program causes a computer to execute storing cache line degeneration information that indicates whether a cache line constituting each of the plurality of ways is degenerated, and the storing includes writing, when an error that occurs in response to the access request causes a predetermined condition to be met, cache line degeneration information that indicates a predetermined cache line where the error occurs is degenerated.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 3 is a diagram of a configuration example of a cache tag;

FIG. 4 is a diagram of a configuration example of an error counter;

DETAILED DESCRIPTION OF THE PREFERRED EMBODIMENTS

Embodiments of a degeneration control device and a degeneration control program according to the present invention are described below in detail with reference to accompanying drawings. Firstly, a degeneration control device according to the first embodiment is described below, and other embodiments of the present invention are described later.

A first embodiment below describes in turn, a gist and features of a degeneration control device according to the first embodiment, a configuration and processes of the degeneration control device, and at last, an advantage of the first embodiment.

[Gist and Features of Degeneration Control Device (First Embodiment)]

Figure 1:
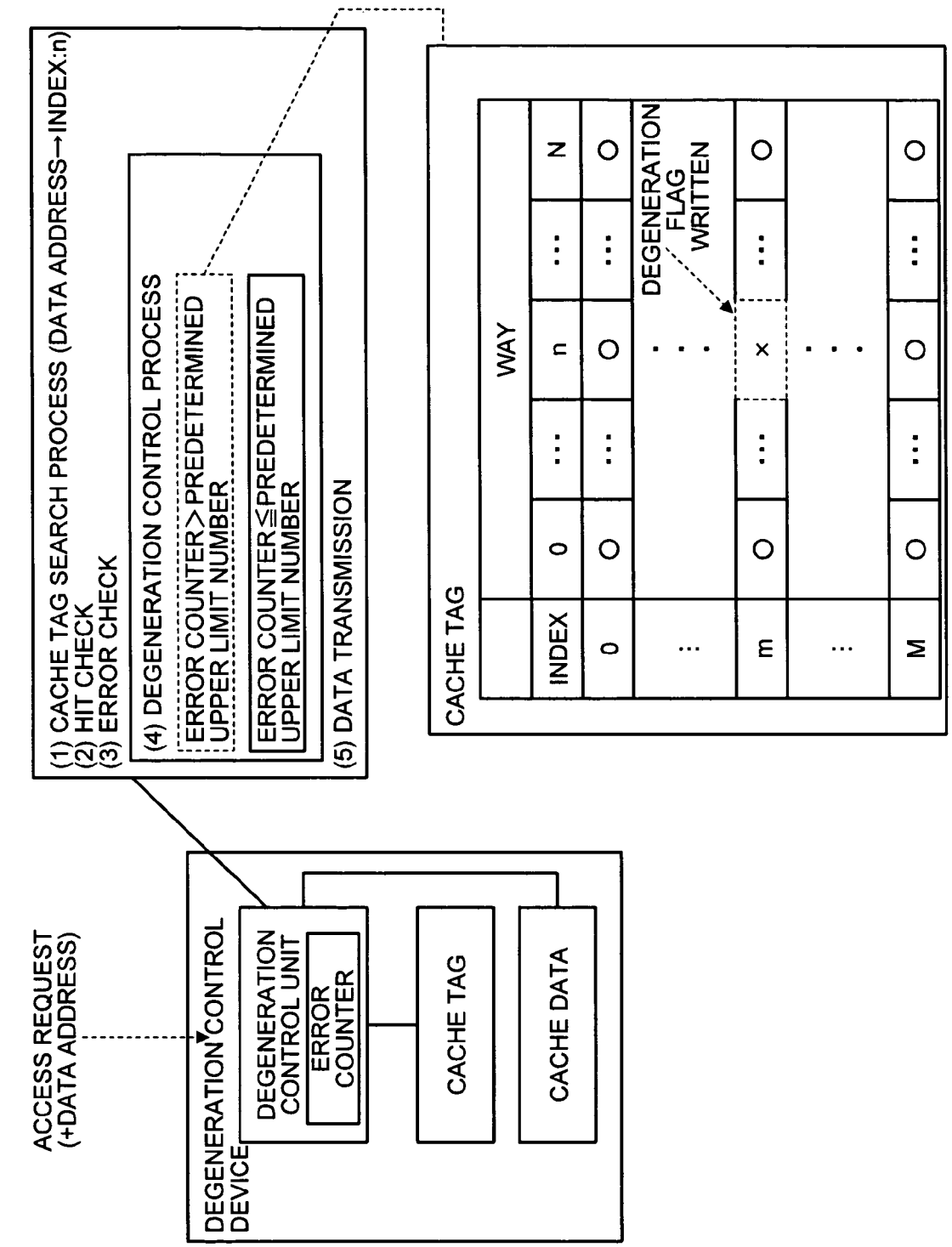
FIG. 1 is a diagram to explain an overview of a degeneration control device according to a first embodiment.

Firstly, the gist and features of the degeneration control device according to the first embodiment is described with reference to FIG. 1. FIG. 1 is a diagram to explain an overview of the degeneration control device according to the first embodiment. As shown in the figure, the gist of the degeneration control device according to the first embodiment lies in that the degeneration control device controls degeneration of a cache having a plurality of ways (i.e., columns inside a cache) based on an error that occurs in response to an access request (e.g., a read request, a write request), and a main feature thereof lies in that the degeneration control device can maintain reliability of an inside of a computer system by eliminating a potential factor beforehand that may possibly develop into a serious failure, while suppressing degradation of operational performance of a cache memory.

To give a specific description of the main features, the degeneration control device according to the first embodiment includes a cache tag, which stores cache line degeneration information (e.g., a degeneration flag) that indicates whether or not each cache line (a minimum unit of data storage area inside a cache) constituting each way is degenerated. The cache tag stores, in addition to the cache line degeneration information, a registration address of data stored in the cache line.

Further, when an access request (e.g., a readout request, a writing request) is received, the degeneration control device starts a cache tag search process (see (1) in FIG. 1). Specifically, the degeneration control device checks an index of a cache (e.g., m-th row) based on an address of data corresponding to the access request, and searches a cache tag corresponding to the index.

Next, the degeneration control device checks a degeneration flag by referring to all ways (i.e., all columns) for information of the searched cache tag. Then, the degeneration control device performs a hit check on each cache line where it is confirmed that the cache line is not degenerated (that is, the degeneration flag is not written, and the cache line is in a usable state) (see (2) in FIG. 1). Specifically, the degeneration control device performs the hit check by determining whether or not the data address corresponding to the access request and a registration address stored in the cache tag are identical.

When a cache line where a hit occurs (referred to below as "hit cache line") is detected as a result of the check, the degeneration control device performs, for example, an error check on cache data of the hit cache line. When an error is detected in the cache data of the hit cache line as a result of the check, the degeneration control device corrects the error and starts a degeneration control process (see (4) in FIG. 1).

To give a specific description of the degeneration control process, firstly the degeneration control device, for example, increments an error counter, which is included to count a number of errors in each way. Further, when the number of errors of the error counter is above a predetermined upper limit number, the degeneration control device temporarily stops a normal process (e.g., a transfer process of cache data corresponding to an access request), writes a content of the cache line (e.g., Way: n, Index: m) where the error occurs to cause the number of errors to exceed the predetermined upper limit number back into a main memory unit not shown in the figure, or into the like, and further writes a degeneration flag (i.e., degeneration information that indicates a cache line is degenerated) into a cache tag of the cache line. By writing the degeneration flag into the cache tag, the cache line is controlled to be in an unusable state (i.e., degeneration control) thereafter. After the degeneration control, the degeneration control device resumes the normal process and transfers cache data where the error is corrected to a requestor (see (5) in FIG. 1).

On the other hand, when the number of errors of the error counter is not above the predetermined upper limit number, the degeneration control device does not write the degeneration flag into the cache tag of the cache line where the error occurs, and transfers cache data where the error is corrected to the requestor as it is (see (5) in FIG. 1). When cache data causes an error, the degeneration control device may transfer cache data where the error is corrected to the requester, and moreover if the cache data is not to be written back, the degeneration control device may read out primary data of data corresponding to the access request from the main memory unit not shown in the figure and the like, and transfer the primary data to the requester.

As can be seen from the foregoing, the degeneration control device according to the first embodiment, with the features mentioned above, can maintain reliability of an inside of a computer system by eliminating a potential factor beforehand that may possibly develop into a serious failure, while suppressing degradation of operational performance of a cache memory.

[Configuration of Degeneration Control Device (First Embodiment)]

Figure 2:
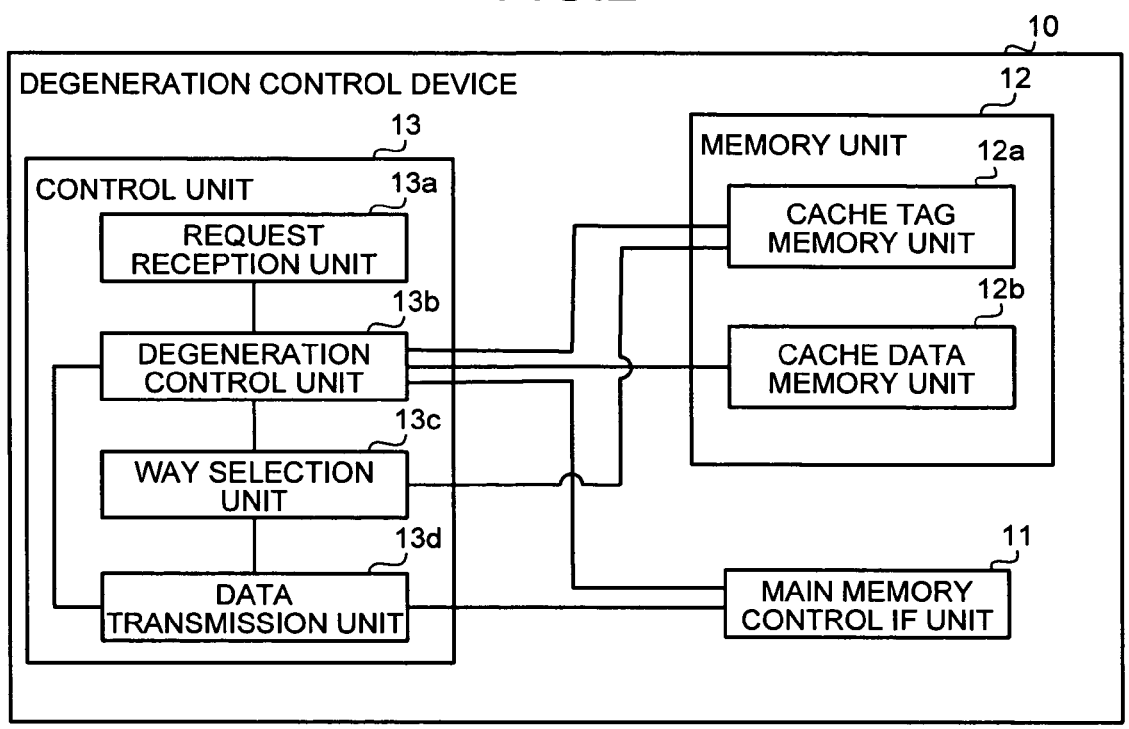
FIG. 2 is a block diagram of a configuration of the degeneration control device according to the first embodiment.

Next, a configuration of the degeneration control device according to the first embodiment is described below with reference to FIG. 2. FIG. 2 is a block diagram of the configuration of the degeneration control device according to the first embodiment. In FIG. 2, only processing units necessary to realize the degeneration control device are shown and a description of other processing units is omitted.

As shown in FIG. 2, the degeneration control device 10 is configured with a main memory control IF unit 11, a memory unit 12, and a control unit 13. Of the configuration above, the main memory control IF unit 11 is a storage unit (i.e., memory unit) that stores predetermined data.

The memory unit 12 is a storage unit (i.e., memory unit) that stores data and programs needed for various kinds of processes performed by the control unit 13, and in particular, includes a cache tag memory unit 12a and a cache data memory unit 12b, which are closely related to the present invention.

Of the configuration above, the cache tag memory unit 12a stores various kinds of information that is related to a cache line, and specifically, the cache tag memory unit 12a is configured to store a degeneration flag, a registration address, a status, and ECC, in correspondence with a way (Way: column) and an index (Index: row) arranged in a cache memory. Here, the degeneration flag is information that indicates whether or not a cache line or a way is in a usable state (which means, not in a state of degeneration), and the degeneration flag may be configured by 1 bit or, considering reliability of the information, may be configured by 3 bit or 5 bit information. Further, the registration address is information that identifies data of the main memory unit stored in the cache line or the like. Further, the status is information that indicates a status of the cache line, and for example, the status indicates whether data of the main memory unit is stored. Further, ECC (Error Correcting Code) is additional data to correct an error of cache tag data, and guarantees reliability of the cache data.

The cache data memory unit 12b stores various kinds of information stored in the main memory unit and the like, and for example, stores frequently used data of data stored in the main memory unit to realize a higher speed of data readout than a speed of data readout from the main memory unit and the like.

The control unit 13 includes an internal memory that stores a predetermined control program, a program defining various kinds of procedures, and necessary data, and the control unit 13 is a processing unit that performs various processes (e.g., a control process of the cache, a control process related to data transmission between an operation execution unit and a main memory control unit or the like not shown in the figure). The control unit 13 particularly includes a request reception unit 13a, a degeneration control unit 13b, a way selection unit 13c, and a data transmission unit 13d, which are closely related to the present invention.

Of the configuration above, the request reception unit 13a receives an access request (e.g., data readout request, data writing request).

The degeneration control unit 13b performs a degeneration control (i.e., a control to put something into an unusable state) on a cache line. Specifically, when the request reception unit 13a receives an access request, the degeneration control unit 13b starts a cache tag search process. To give a specific description of the cache tag search process, the degeneration control unit 13b checks an index (referred to below as "hit index") inside a cache based on an address of data corresponding to the access request, and searches a cache tag stored in the cache tag memory unit 12a for a cache tag corresponding to the hit index.

Then, the degeneration control unit 13b checks a degeneration flag by referring to all ways (i.e., all columns) for information of the searched cache tag. Then, the degeneration control unit 13b performs a hit check on each cache line where it is confirmed that the cache line is not degenerated (that is, the degeneration flag is not written, and the cache line is in a usable state). On the other hand, the degeneration control unit 13b performs a mask process (so that a hit check is not performed on the cache line) on each cache line where it is confirmed the cache line is degenerated. To give a specific description of the hit check, the degeneration control unit 13b performs a check, for example, to determine whether an address of data corresponding to the access request and a registration address stored in the cache tag are identical (that is, a check to determine whether data stored in the cache line and data corresponding to the access request are identical).

When a cache line where a hit occurs (referred to below as "hit cache line") is detected as a result of the check, the degeneration control unit 13b performs, for example, an error check on cache data of the hit cache line. When an error is detected in the cache data of the hit cache line as a result of the check, the degeneration control unit 13b corrects the error and starts a degeneration control process. On the other hand, when an error is not detected in the hit cache line, the degeneration control unit 13b outputs a command to the data transmission unit 13d, instructing the data transmission unit 13d to transfer the cache data of the hit cache line to a requestor.

Further, to give a specific description of the degeneration control process, as illustrated in FIG. 4, the degeneration control unit 13b includes, for example, an error counter to count the number of errors in each way (for example, Way: n) as binary digits. Further, the degeneration control unit 13b increments an error counter corresponding to a way that includes the hit cache line where the error occurs, and when the number of errors of the error counter is above the predetermined upper limit number (e.g., 2 to the j-th power), the degeneration control unit 13b temporarily stops a normal process (e.g., a transfer process of cache data corresponding to an access request), writes a content of the cache line (e.g., Way: n, Index: m) where the error occurs to cause the number of errors to exceed the predetermined upper limit number back into the main memory unit not shown in the figure, or into the like. The degeneration control unit 13b further writes a degeneration flag (i.e., degeneration information that indicates a cache line is degenerated) into a cache tag of the cache line to be degenerated. By writing the degeneration flag into the cache tag, the hit cache line is controlled to be in an unusable state (i.e., degeneration control) thereafter. After the degeneration control process, the degeneration control unit 13b resumes the normal process, and outputs a command to the data transmission unit 13d, instructing the data transmission unit 13d to transfer the cache data where the error is corrected to a requestor.

Contrary to the case described above, when the number of errors of the error counter is not above the predetermined upper limit number, the degeneration control unit 13b may not write the degeneration flag into the cache tag of the cache line where the error occurs, and may output a command to the data transmission unit 13d, instructing the data transmission unit 13d to transfer the cache data where the error is corrected to the requestor.

Further, the degeneration control unit 13b continues to count the number of errors after writing the degeneration flag into the cache tag with respect to the cache line, and when the number of errors of the error counter is above a predetermined upper limit number (e.g., 2 to the i-th power), which is larger than 2 to the j-th power, the degeneration control unit 13b writes a way degeneration flag that indicates all cache lines included in the way where the number of errors exceeds the upper limit number are degenerated. After the operation, the way is controlled to be in an unusable state (i.e., degeneration control). The way degeneration flag is stored in the cache tag memory unit 12a or alternatively the way degeneration flag may be stored in other memory units (e.g., a register, a latch).

When no hit cache line is detected as a result of the hit check (which means, no data corresponding to the access request is stored in the cache), the degeneration control unit 13b outputs a way selection command to a way selection unit 13c to determine a cache line to cache (register) data corresponding to the access request. Then, the degeneration control unit 13b, receiving a registration way from the way selection unit 13c, updates the cache tag stored in the cache tag memory unit 12a with respect to the cache line to which the request data is cached (for example, updates a registration address), and outputs a request command of data corresponding to the access request to the main memory control unit via the main memory control IF unit 11. Further, the degeneration control unit 13b, receiving the request data from the main memory control unit, outputs a command to the data transmission unit 13d, instructing the data transmission unit 13d to transfer the data to the requester, and the degeneration control unit 13b stores the received request data in the cache data memory unit 12b.

The way selection unit 13c is a processing unit that receives a way selection command from the degeneration control unit 13b and selects a way including a cache line to which data corresponding to the access request is cached. Specifically, the way selection unit 13c stores, for example, information about the last-used time of cache lines, and selects a way candidate including a least recently used cache line based on the information. Next, the way selection unit 13c refers to degeneration information of the cache tag stored in the cache tag memory unit 12a, and checks whether a cache line, corresponding to the index acquired from an address of data according to the access request, in the way candidate is degenerated. As a result, when the cache line in the way candidate is not degenerated, the way selection unit 13c determines the way candidate as a registration way where the data corresponding to the access request is to be cached, and outputs information of the determined registration way to the degeneration control unit 13b. On the other hand, when the cache line in the way candidate is degenerated, the way selection unit 13c selects a second way candidate based on the information about the last-used time of cache lines, and repeats the same processes above until a registration way is determined.

The data transmission unit 13d is a processing unit that transfers request data to the access requester, and the like. Specifically, the data transmission unit 13d transfers cache data (e.g., corrected cache data) received from the degeneration control unit 13b to the requestor.

[Main Process of Degeneration Control Device (First Embodiment)]

Figure 5:
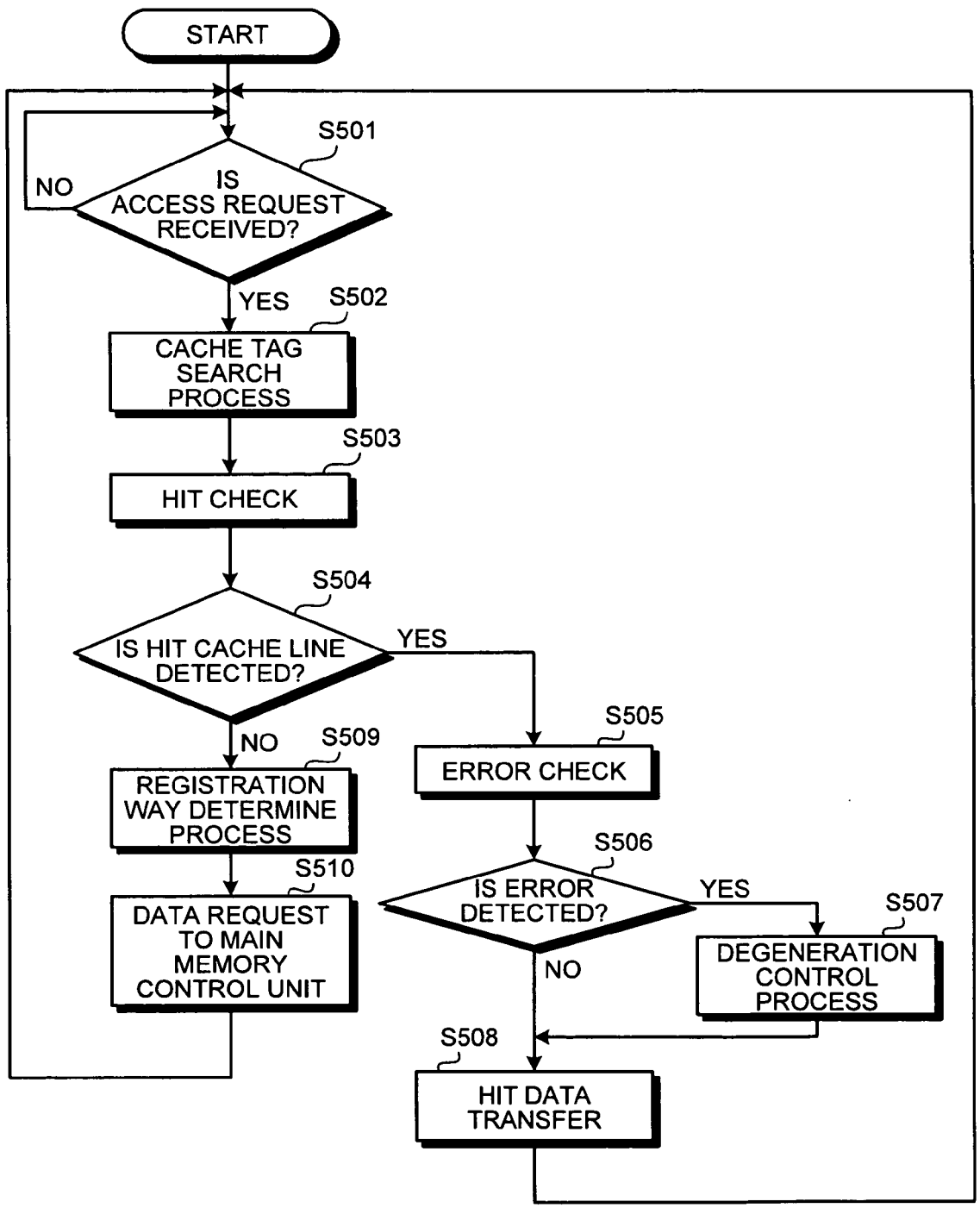
FIG. 5 is a flowchart illustrating a flow of a main process of the degeneration control device according to the first embodiment.

Next, a main process of the degeneration control device according to the first embodiment is described below with reference to FIG. 5. FIG. 5 is a flowchart showing a flow of the main process of the degeneration control device according to the first embodiment. As shown in the figure, when an access request is received (Step S501 Yes), the degeneration control unit 13b performs a cache tag search process, which is described in detail later (Step S502).

Further, the degeneration control unit 13b performs a hit check on a cache line searched at the cache tag search process (Step S503). To give a specific description of the hit check, the degeneration control unit 13b checks, for example, whether address of data according to the access request and a registration address stored in the cache tag are identical. If a cache line where a hit occurs (referred to below as "hit cache line") is detected as a result of the above (Step S504 Yes), the degeneration control unit 13b performs an error check on cache data of the hit cache line (Step S505). If an error is detected in the cache data of the hit cache line as a result of the above (Step S506 Yes), the degeneration control unit 13b corrects the detected error and starts a degeneration control process, which is described in detail later.

On the other hand, if an error is not detected in the cache data of the hit cache line (Step S506 No), the degeneration control unit 13b outputs a command to the data transmission unit 13d, instructing the data transmission unit 13d to transfer the cache data of the hit cache line to the requester, and the data transmission unit 13d, receiving the instruction, transfers the cache data to the requestor (Step S508).

Back to the description of Step S504, if the hit cache line is not detected (Step S504 No), the degeneration control unit 13b performs a registration way determine process, which is described in detail later (Step S509). Further the degeneration control unit 13b outputs a request command, which requests data corresponding to the access request, to the main memory control unit via the main memory control IF unit 11 (Step S510). The processes above are repeatedly performed during start-up of the degeneration control device 10.

[Cache Tag Search Process (First Embodiment)]

Figure 6:
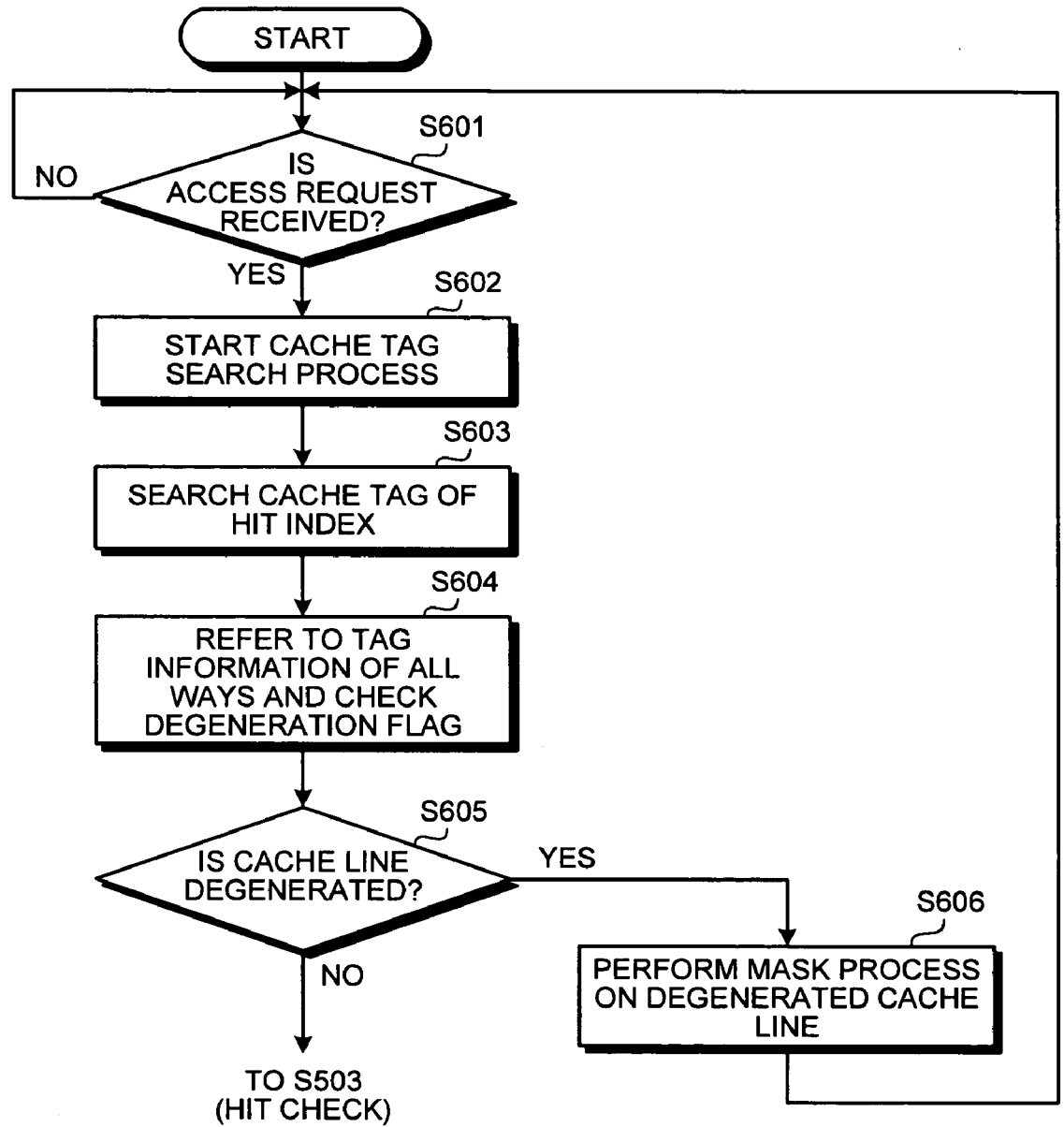
FIG. 6 is a flowchart illustrating a flow of a cache tag search process according to the first embodiment.

Next, the cache tag search process of the degeneration control device according to the first embodiment is described below with reference to FIG. 6. FIG. 6 is a flowchart showing a flow of the cache tag search process of the degeneration control device according to the first embodiment. As shown in the figure, when an access request is received (Step S601 Yes), the degeneration control unit 13b starts the cache tag search process (Step S602).

Specifically, the degeneration control unit 13b checks an index (referred to below as "hit index") inside the cache based on an address of data according to the access request, and searches cache tags stored in the cache tag memory unit 12a for a cache tag corresponding to the hit index (Step S603).

Next, the degeneration control unit 13b checks the degeneration flag by referring to all ways (i.e., all columns) for information of the searched cache tag (Step S604). Then, if a cache line is not degenerated (that is, if the degeneration flag is not written, and the cache line is in a usable state) (S605 No), the degeneration control unit 13b performs a hit check (at Step S503 above) on each cache line that is not degenerated.

On the other hand, if the cache line is degenerated (Step S605 Yes), the degeneration control unit 13b performs a mask process (so that a hit check is not performed on the cache line) on each cache line that is degenerated.

[Degeneration Control Process (First Embodiment)]

Figure 7:
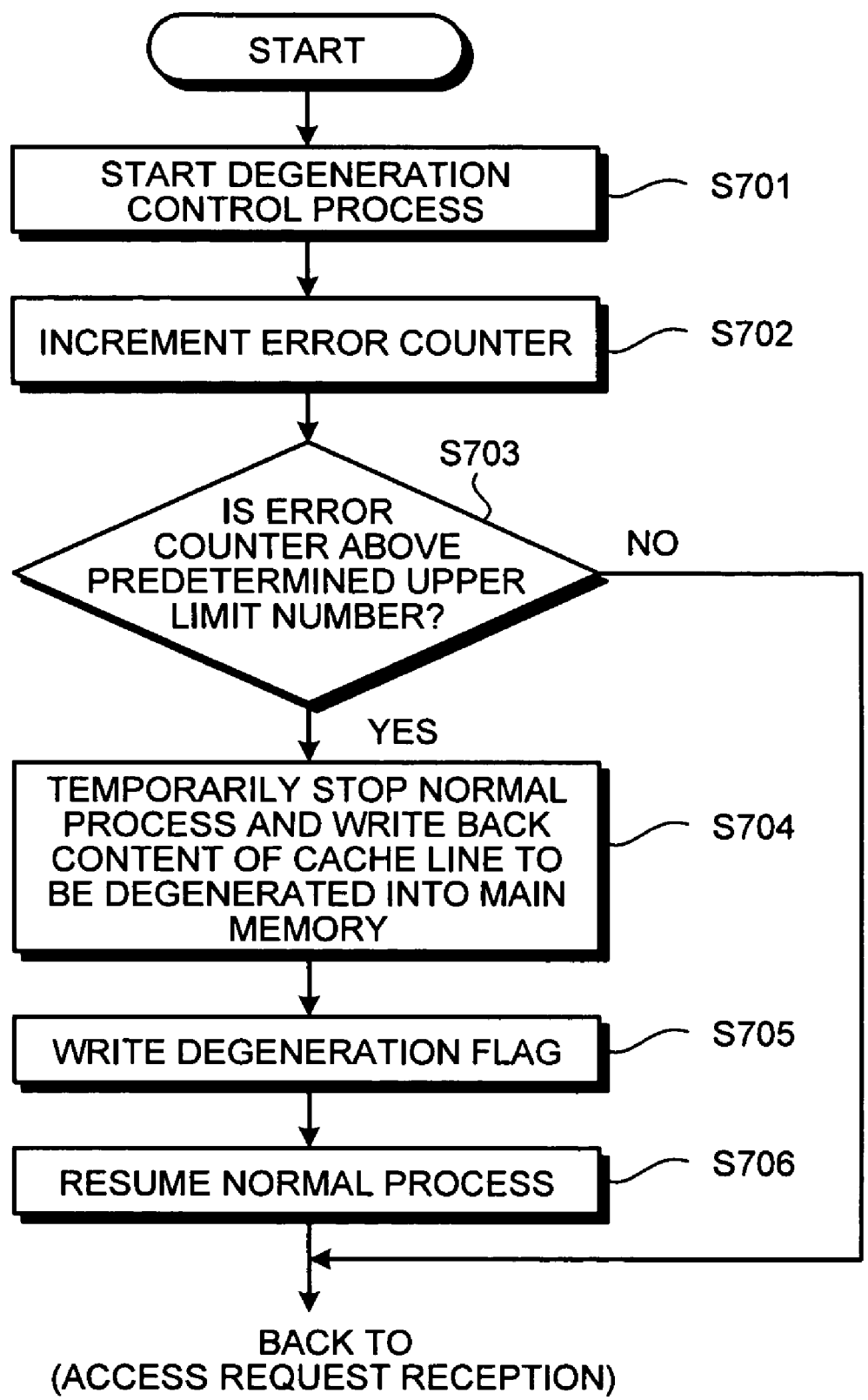
FIG. 7 is a flowchart illustrating a flow of a degeneration control process according to the first embodiment.

Next, a degeneration control process of the degeneration control device according to the first embodiment is described below with reference to FIG. 7. FIG. 7 is a flowchart showing a flow of the degeneration control process of the degeneration control device according to the first embodiment. For example, when an error is detected in cache data of a cache line as a result of the error check (at Step S505 above), the degeneration control unit 13b starts the degeneration control process (Step S701).

Specifically, the degeneration control unit 13b includes, for example, the error counter to count the number of errors in each way as binary digits as illustrated in FIG. 4. Further, the degeneration control unit 13b increments the number of errors of the error counter corresponding to a way including a hit cache line where the error is detected (Step S702). If the number of errors of the error counter is above the predetermined upper limit number (e.g., 2 to the j-th power) (Step S703 Yes), the degeneration control unit 13b temporarily stops a normal process and writes a content of the cache line (e.g., Way: n, Index: m) where the error occurs to cause the number of errors to exceed the predetermined upper limit number and which is to be degenerated back into the main memory unit or the like (Step S704). Further, the degeneration control unit 13b writes the degeneration flag (i.e., degeneration information that indicates the cache line is degenerated) into the cache tag with respect to the cache line to be degenerated (Step S705).

After the degeneration control process, the degeneration control unit 13b resumes the normal process (Step S706), outputs a command to the data transmission unit 13d, instructing the data transmission unit 13d to transfer the corrected cache data to the requester, and returns to receive an access request, although not shown in the figure. On the other hand, if the number of errors of the error counter is not above the predetermined upper limit number (e.g., 2 to the j-th power) (Step S703 No), the degeneration control unit 13b outputs a command to the data transmission unit 13d, instructing the data transmission unit 13d to transfer the corrected cache data to the requester, and returns to receive an access request, similarly to the description above.

Although not shown in the figure, the degeneration control unit 13b continues to count the number of errors after writing the degeneration flag into the cache tag with respect to the cache line, and when the number of errors of the error counter is above a predetermined upper limit number (e.g., 2 to the i-th power), which is larger than 2 to the j-th power, the degeneration control unit 13b writes a way degeneration flag that indicates all cache lines included in the way where the number of errors exceeds the upper limit number are degenerated. After that, the way is controlled to be in an unusable state (i.e., degeneration control).

[Registration Way Determine Process (First Embodiment)]

Figure 8:
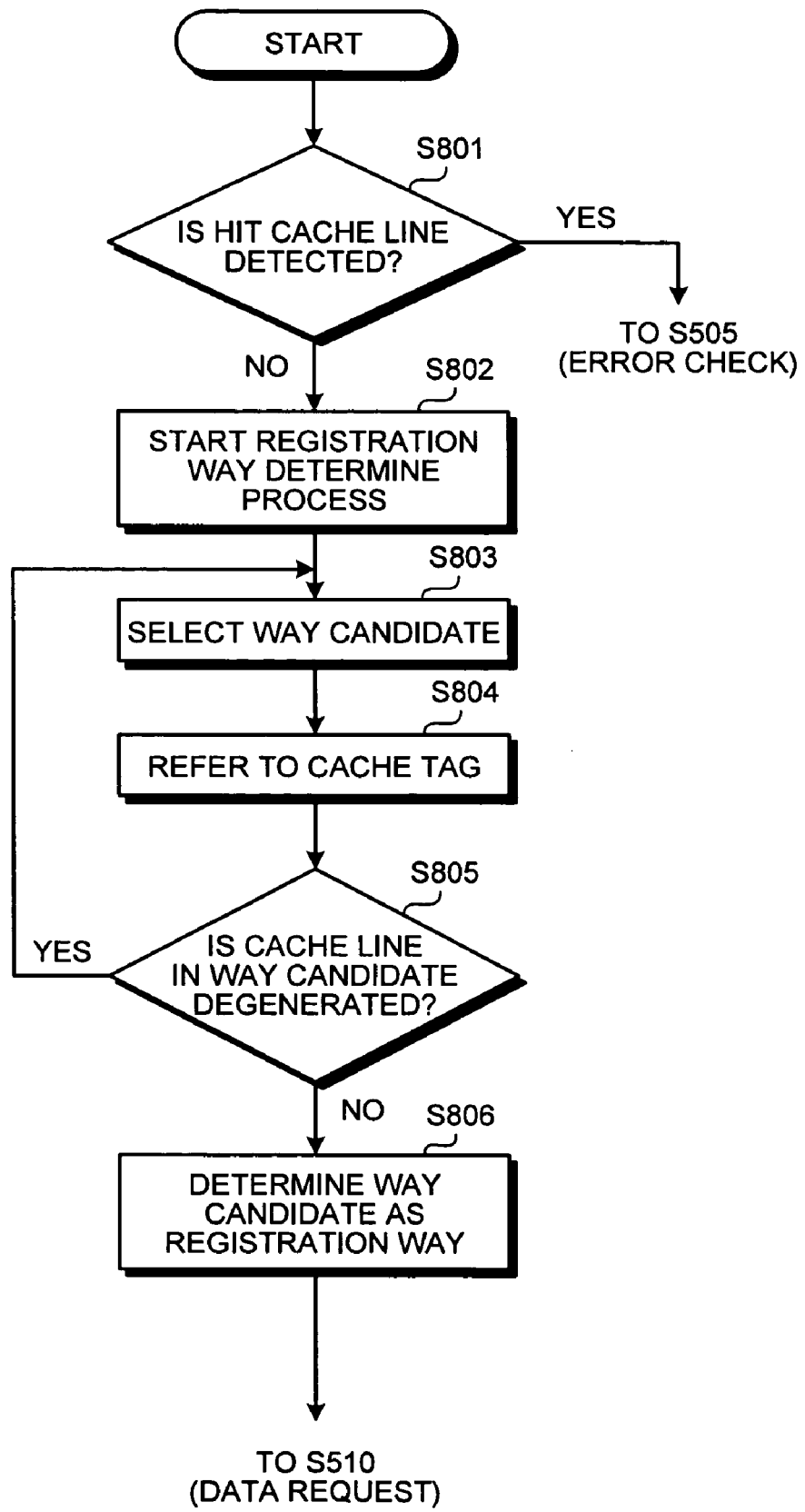
FIG. 8 is a flowchart illustrating a registration way determination process according to the first embodiment.

Next, a registration way determine process of the degeneration control device according to the first embodiment is described below with reference to FIG. 8. FIG. 8 is a flowchart showing a flow of the registration way determine process of the degeneration control device according to the first embodiment. As shown in the figure, if a hit cache line where a hit occurs is not detected (that is, data corresponding to the access request does not exist inside the cache) (Step S801 No), the degeneration control unit 13b outputs a way selection command to the way selection unit 13c to determine a cache line where data corresponding to the access request is to be cached (registered). The way selection unit 13c, receiving the way selection command, starts a registration way determine process (Step S802).

Specifically, the way selection unit 13c stores information about the last-used time of cache lines, and selects a way candidate including a least recently used cache line based on the information (Step S803). Next, the way selection unit 13c refers to degeneration information of the cache tag stored in the cache tag memory unit 12a (Step S804), and checks whether a cache line, corresponding to the index acquired from an address of data according to the access request, in the way candidate is degenerated.

As a result of the above, if the cache line in the way candidate is not degenerated (Step S805 No), the way selection unit 13c determines the way candidate as a registration way where the data corresponding to the access request is to be cached (Step S806), and outputs information of the determined registration way to the degeneration control unit 13b. Further, the degeneration control unit 13b receiving the information of the registration way from the way selection unit 13c outputs a request command to the main memory unit for data corresponding to the access request via the main memory control IF unit 11 (Step S510 above). On the other hand, if the cache line in the way candidate is degenerated (Step S805 Yes), the way selection unit 13c selects a second way candidate based on information of the last used time of cache lines, and repeats the same processes above until a registration way is determined.

Advantage of First Embodiment

As described above, according to the first embodiment, in each cache line constituting a plurality of ways, the degeneration control device stores cache line degeneration information that indicates whether a cache line is degenerated, and when an error that occurs in response to an access request causes a predetermined condition to be met, the degeneration control device writes cache line degeneration information that indicates a cache line where the error occurs is degenerated. Thus, the degeneration control device can perform a degeneration control (a control to put something into an unusable state) on each cache line instead of performing the degeneration control on each way, whereby the degeneration control device can maintain reliability of an inside of a computer system by eliminating a potential factor (i.e., a correctable error) beforehand that may possibly develop into a serious failure, while suppressing degradation of operational performance of a cache memory.

Further, according to the first embodiment, the degeneration control device counts the number of errors that occur in response to an access request in each of plural ways, and writes, when the counted number of errors exceeds a predetermined upper limit number, cache line degeneration information that indicates a cache line where the error occurs to cause the number of errors to exceed the predetermined upper limit number is degenerated. Thus, the degeneration control device, which does not include a counter to count the number of errors in each cache line, can substantially perform an error control for each cache line (in fact, since it is likely that a faulty cache line frequently causes an error, there is little harm that the degeneration control device is configured to count the number of errors of cache lines in each way), whereby the degeneration control device can maintain reliability of an inside of a computer system by eliminating a potential factor beforehand that may possibly develop into a serious failure, while suppressing degradation of operational performance of a cache memory.

Further, according to the first embodiment, the degeneration control device writes, when the counted number of errors exceeds another predetermined upper limit number that is larger than the predetermined upper limit number, with respect to all cache lines included in the way where the number of errors exceeds the other predetermined upper limit number, way degeneration information that indicates the entire way of the cache lines is degenerated. Thus the degeneration control device can degenerate an entire way with respect to a way that includes a cache line frequently causing an error, whereby the degeneration control device can maintain reliability of an inside of a computer system by eliminating a potential factor beforehand that may possibly develop into a serious failure, while suppressing degradation of operational performance of a cache memory.

Further, according to the first embodiment, the degeneration control device selects, when data corresponding to the access request is not stored in the cache, a cache line where the data corresponding to the access request is to be cached, by referring to the cache line degeneration information or the way degeneration information or both. Thus, the degeneration control device does not use a degenerated cache line, whereby the degeneration control device can maintain reliability of an inside of a computer system by eliminating a potential factor beforehand that may possibly develop into a serious failure, while suppressing degradation of operational performance of a cache memory.

Although the first embodiment of the present invention has been described so far, the present invention can be implemented by various embodiments other than the first embodiment above. Hence, other embodiments of the present invention are described below.

(1) Error Check of Cache Tag

Although, in the first embodiment, a case where the degeneration control unit 13b performs, for example, an error check on cache data of a cache line corresponding to an access request to control the degeneration of the cache line is described, the present invention is not limited to the embodiment alone. Following the cache tag search process (see FIG. 6) of the degeneration control device described in the first embodiment above, the degeneration control unit 13b may further perform an error check (e.g., an error check of a degeneration flag) on a cache tag including information of a cache line corresponding to the access request, and control the degeneration of the cache line, further considering the check result. Thus, a case where degeneration of a cache line is controlled further considering the error check result of a cache tag is described below.

A configuration of the degeneration control device here is basically the same as the configuration of the degeneration control device 10 described in the first embodiment above, except different aspects described below.

The degeneration control unit 13b performs an error check of a cache tag in each cache line where it is confirmed by the cache tag search process that the cache line is not degenerated. When an error is detected as a result of the check, the degeneration control unit 13b, similarly to the case described in the first embodiment above, corrects the detected error of the cache tag and performs the degeneration control process (see FIG. 7), which is similar to the degeneration control process described in the first embodiment above.

Specifically, the degeneration control unit 13b increments a number of errors of an error counter corresponding to a way including the cache line corresponding to the error, and when the number of errors of the error counter is above the predetermined upper limit number, the degeneration control unit 13b temporarily stops a normal process and writes a content of the cache line to be degenerated, where the error occurs to cause the number of errors to exceed the upper limit number, back into a main memory unit not shown in the figure, or into the like. Further, the degeneration control unit 13b writes a degeneration flag (i.e., degeneration information that the cache line is degenerated) into a cache tag with respect to the cache line to be degenerated. On the other hand, when the number of errors of the error counter is not above the predetermined upper limit number, the degeneration control unit 13b does not write the degeneration flag into the cache tag. Here, the error counter is the same with the error counter described in the first embodiment above.

On the other hand, when an error is not detected as a result of the error check on the cache tag, the degeneration control unit 13b performs a hit check, which is described in the first embodiment above, on a cache line where it is confirmed by the cache tag search process that the cache line is not degenerated.

Figure 9:
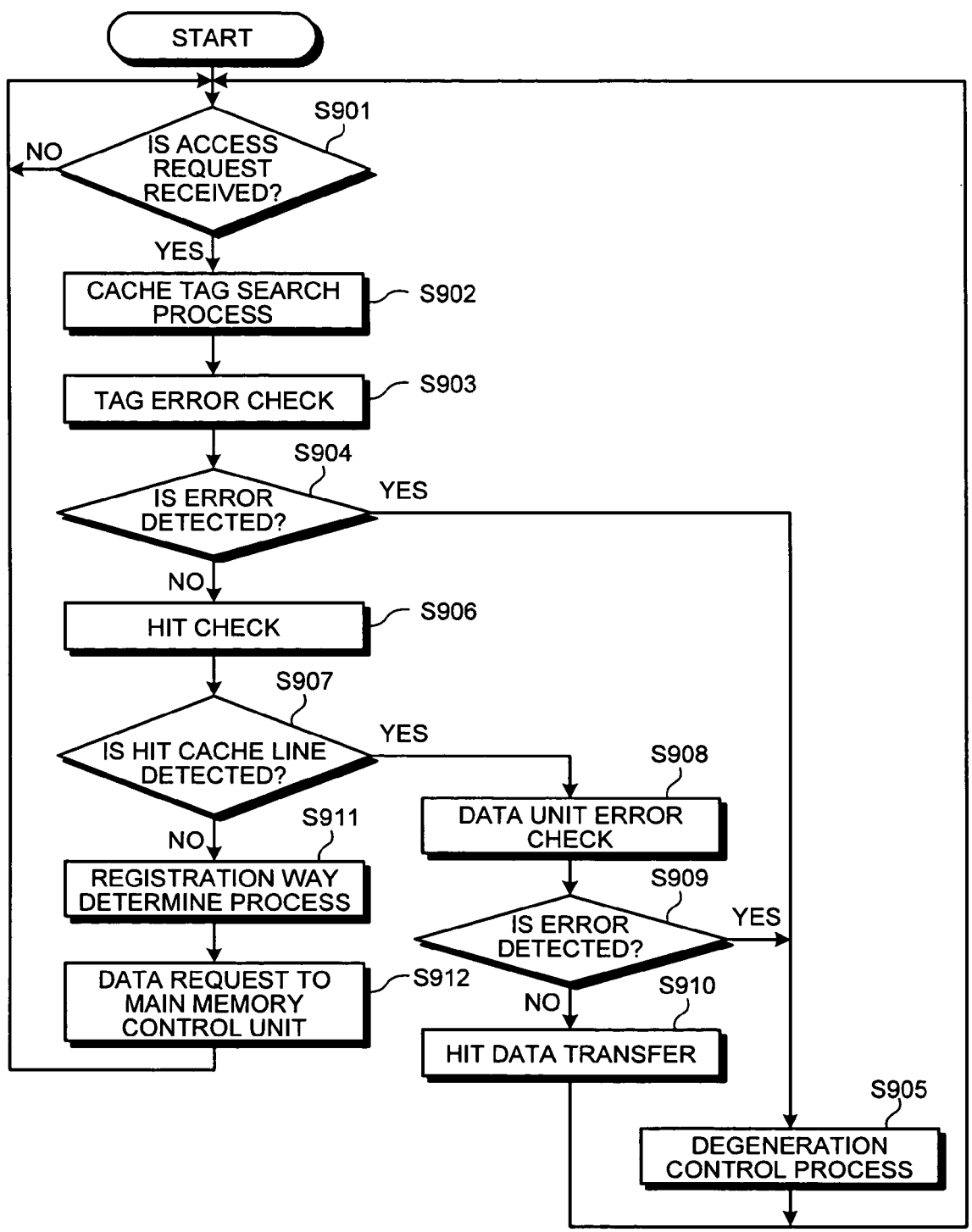
FIG. 9 is a flowchart illustrating a flow of a main process of a degeneration control device according to a second embodiment.

Next, a flow of a process of the degeneration control device in the case is described with reference to FIG. 9. FIG. 9 is a flowchart showing a flow of a main process of the degeneration control device according to the second embodiment. As shown in the figure, when an access request is received (Step S901 Yes), the degeneration control unit 13b performs the cache tag search process described in the first embodiment above (Step S902).

Next, the degeneration control unit 13b performs an error check of a cache tag (i.e., a tag error check) on each cache line where it is confirmed by the cache tag search process that the cache line is not degenerated (Step S903). As a result of the check, if an error is detected (Step S904 Yes), the degeneration control unit 13b corrects the detected error of the cache tag and performs a degeneration control process, which is similar to the degeneration control process described in the first embodiment above (Step S905, see FIG. 7), with respect to the cache line corresponding to the error.

On the other hand, when an error is not detected as a result of the error check of the cache tag (Step S904), the degeneration control unit 13b performs a hit check, which is described in the first embodiment above, on a cache line where it is confirmed by the cache tag search process that the cache line is not degenerated. Here, a description of a flow of following processes (Steps S906 to S912) is omitted because the flow of processes is similar to the flow of processes described in the first embodiment above.

As described, the degeneration control device does not control degeneration of a cache line only by performing an error check of cache data of a cache line corresponding to an access request but controls degeneration of the cache line by further performing an error check of a cache tag including information of the cache line corresponding to the access request and considering the check result, whereby the degeneration control device can control degeneration of a cache line, for example, maintaining reliability of degeneration information in a cache tag.

(2) Selection of Registration Way

In the first embodiment above, it is described, when data corresponding to an access request does not exist in a cache, a registration way is selected to determine a cache line where data corresponding to the access request is to be cached (registered). The present invention, however, is not limited to the case above. When all cache lines to be selected are degenerated, a cache line where data corresponding to the access request is to be cached may be selected from cache lines according to cache line degeneration information not to way degeneration information.

Thus, even when all cache lines corresponding to the access request are degenerated, the degeneration control device can reliably respond to the access request by validating back and selecting a cache line where a probability that a serious failure occurs to data storage area therein is considered low (here, since the number of errors occurred is smaller when a cache line is degenerated than the number of errors occurred when a way itself is degenerated, a probability that a serious failure occurs to data storage area is considered low when a cache line is degenerated), whereby the degeneration control device can maintain reliability of an inside of a computer system by eliminating a potential factor beforehand that may possibly develop into a serious failure, while suppressing degradation of operational performance of a cache memory.

(3) Device Configuration etc

Further, of the processes described in the embodiments above, all or some part of processes that are described to be automatically performed may be performed manually, and, all or some part of processes that are described to be manually performed may be performed automatically by a known method. Besides, a process procedure, a control procedure, a specific name, and information including various kinds of data and parameters may be arbitrarily changed unless otherwise specified.

Further, each element of the degeneration control device 10 shown in the FIG. 2 represents a concept of the function, and thus the degeneration control device 10 does not necessarily require the same physical configuration as illustrated. Specifically, a manner of division/integration of each element of the degeneration control device 10 is not limited to that shown in figures. For example, the degeneration control unit 13b and the way selection unit 13c may be integrated. Depending on various types of loads and use conditions, all or some part of the configuration may be divided/integrated functionally or physically on any unit basis. Further, all or some part of each process performed by the degeneration control device 10 may be achieved by a CPU and a program analyzed and executed by the CPU, or may be achieved as hardware based on wired logic.

(4) Degeneration Control Program

Figure 10:
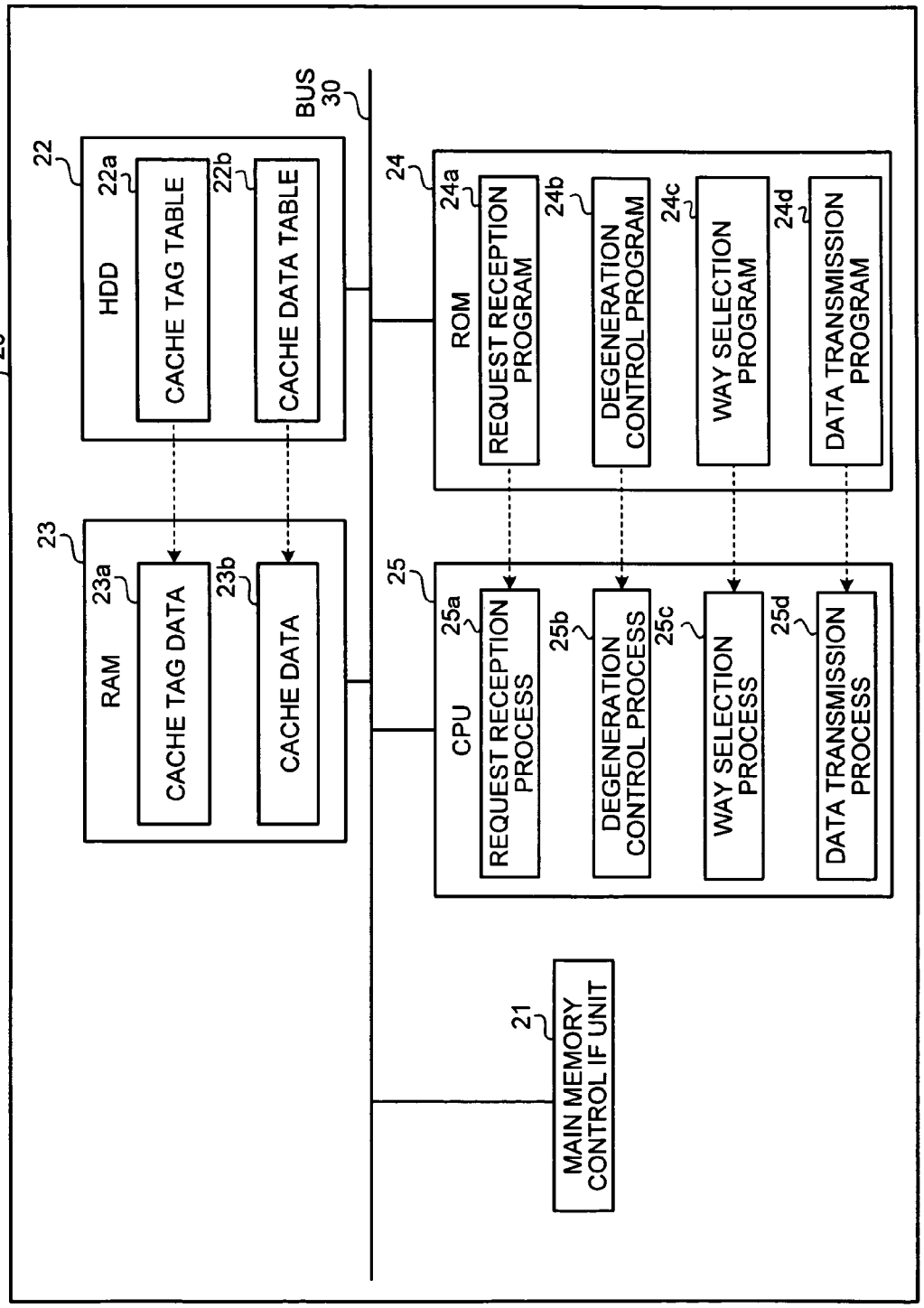
FIG. 10 is a diagram of a computer which performs a degeneration control process.
Figure 11:
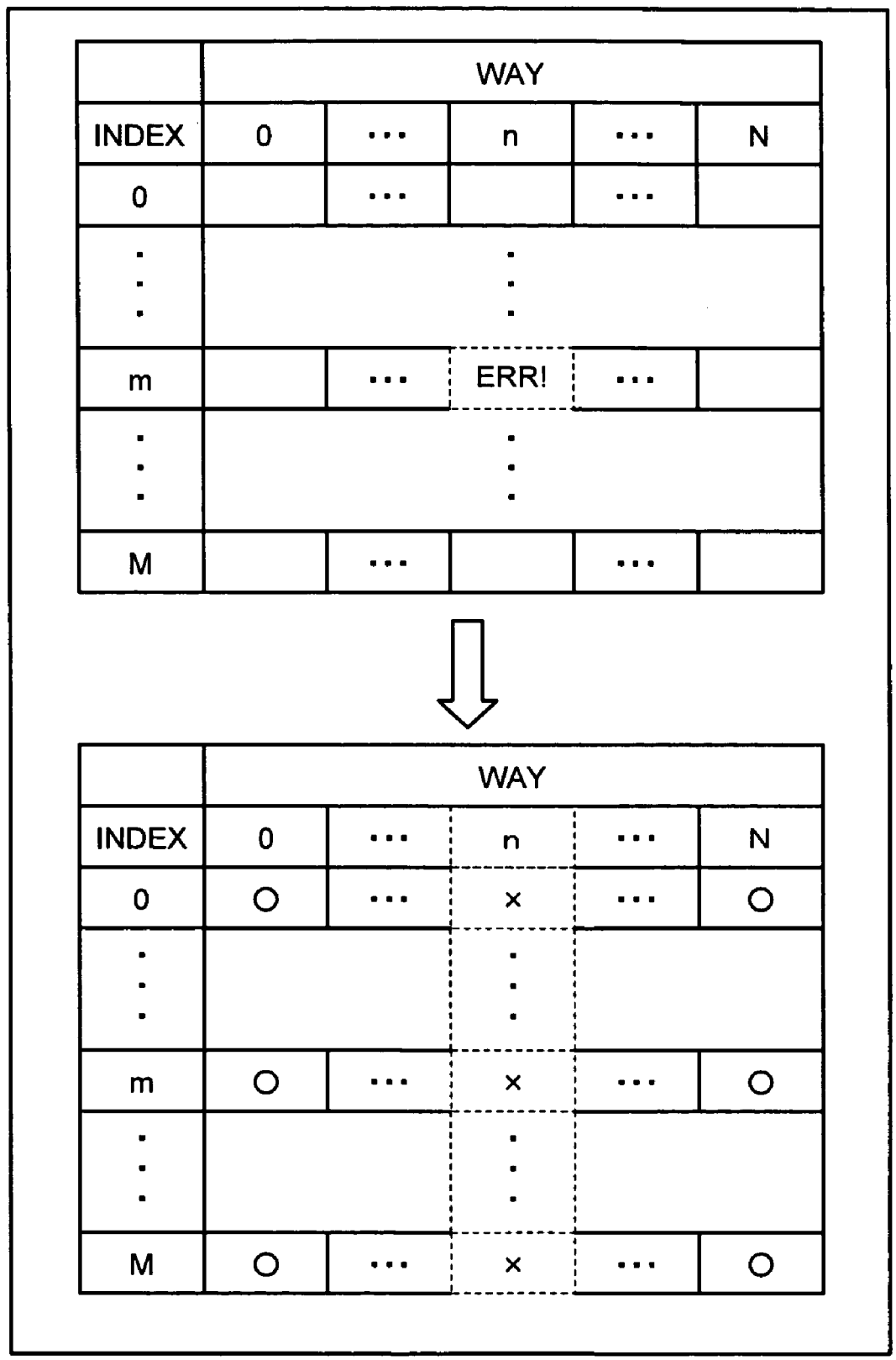
FIG. 11 is a diagram of a degeneration control process according to a conventional technology.

Further, various processes described in the above embodiment may be achieved through an execution of a previously prepared program on a computer system such as a personal computer, and a work station. Here, an example of a computer system that executes a program with the similar function as the processes of the degeneration control device 10 described in the first embodiment above is described below. FIG. 10 is a diagram of a computer that executes a degeneration control program.

As shown in the figure, a computer 20, that is, the degeneration control device includes a main memory control IF unit 21, a HDD 22, a RAM 23, a ROM 24, and a CPU 25, and a predetermined bus 30 which connects these units. Here, the main memory control IF unit 21 corresponds to the main memory control IF unit 11 shown in the FIG. 2.

Firstly, a degeneration control program exerting the similar function as the degeneration control device 10 described in the first embodiment above is stored beforehand in the ROM 24, that is, a request reception program 24a, a degeneration control program 24b, a way selection program 24c, and a data transmission program 24d are stored beforehand in the ROM 24 as shown in FIG. 10. Here, the programs 24a, 24b, 24c, and 24d may be integrated or divided as needed, similarly to each element of the degeneration control device 10 shown in FIG. 2.

The CPU 25 reads out the programs 24a, 24b, 24c, and 24d from the ROM 24 and executes the programs, and as shown in the FIG. 10, each of the programs 24a, 24b, 24c, and 24d function as a request reception process 25a, a degeneration control process 25b, a way selection process 25c, and a data transmission process 25d, respectively. Further, each of the processes 25a, 25b, 25c, and 25d correspond to the request reception unit 13a, the degeneration control unit 13b, the way selection unit 13c, and the data transmission unit 13d of the degeneration control device 10 shown in FIG. 2, respectively.

Further, as shown in FIG. 10, the HDD 22 includes a cache tag table 22a and a cache data table 22b. The cache tag table 22a and the cache data table 22b correspond to the cache tag memory unit 12a and the cache data memory unit 12b of the degeneration control device 10 shown in FIG. 2, respectively. The CPU 25 reads out the cache tag data 23a and the cache data 23b from the cache tag table 22a and the cache data table 22b, stores the cache tag data 23a and the cache data 23b in the RAM 23, and performs an information validation process based on the cache tag data 23a and the cache data 23b stored in the RAM 23.

The above described programs 24a, 24b, 24c, and 24d are not necessarily be stored in the ROM 24 from a start, and may be stored, for example, in "a portable physical medium" inserted into the computer 20, such as a flexible disk (FD), a CD-ROM, an MO disk, a DVD disk, a magneto-optical disk, and an IC card, or in "a fixed physical medium" such as a hard disk dive (HDD) arranged inside or outside the computer 20. Further, the programs 24a, 24b, 24c, and 24d may be stored in "another computer (or another server)" that is connected to the computer 20 via a public line, the Internet, LAN, or WAN, so that the computer 20 can read out the programs therefrom and execute the same.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A degeneration control device that controls degeneration of a cache having a plurality of ways based on an error that occurs in response to an access request, comprising:
   a cache line degeneration information memory unit, which stores cache line degeneration information that indicates whether a cache line constituting each of the plurality of ways is degenerated;
   a degeneration control unit, which writes, when an error that occurs in response to the access request causes a predetermined condition to be met, cache line degeneration information that indicates a predetermined cache line where the error occurs is degenerated in the cache line degeneration information memory unit; and
   a way selection unit, which selects, when data corresponding to the access request is not stored in the cache, a cache line where the data corresponding to the access request is to be cached, by referring to at least one of the cache line degeneration information and way degeneration information stored in the cache line degeneration information memory unit,
   the way selection unit selecting, when all cache lines to be selected as areas where the data is cached are degenerated, a cache line where data corresponding to the access request is to be cached, from cache lines constituting a way which is not degenerated, by referring to the cache line degeneration information and by referring not to the way degeneration information, and preferentially validating back the selected cache line from the degeneration.

2. The degeneration control device according to claim 1, further comprising
   an error number count unit, which counts a number of errors that occur in response to the access request for each of the plurality of ways, wherein
   the degeneration control unit writes, when the number of errors counted by the error number count unit exceeds a predetermined upper limit number, cache line degeneration information that indicates a cache line where the error occurs to cause the number of errors to exceed the predetermined upper limit number is degenerated.

3. The degeneration control device according to claim 2, wherein
   the degeneration control unit writes, when the number of errors counted by the error number count unit exceeds another predetermined upper limit number that is larger than the predetermined upper limit number, with respect to all cache lines included in the way where the number of errors exceeds the other predetermined upper limit number, way degeneration information that indicates the entire way of the cache lines is degenerated.

4. A computer-readable recording medium that stores therein a computer program for controlling degeneration of a cache having a plurality of ways based on an error that occurs in response to an access request, the computer program causing a computer to execute:
   storing cache line degeneration information that indicates whether a cache line constituting each of the plurality of ways is degenerated,
   the storing including writing, when an error that occurs in response to the access request causes a predetermined condition to be met, cache line degeneration information that indicates a predetermined cache line where the error occurs is degenerated, and
   selecting, when data corresponding to the access request is not stored in the cache, a cache line where the data corresponding to the access request is to be cached, by referring to at least one of the cache line degeneration information and way degeneration information stored,
   the selecting including selecting, when all cache lines to be selected as areas where the data is cached are degenerated, a cache line where data corresponding to the access request is to be cached, from cache lines constituting a way which is not degenerated, by referring to the cache line degeneration information and by referring not to the way degeneration information, and preferentially validating back the selected cache line from the degeneration.

* * * * *